Feb. 1, 1949.  T. BEGG  2,460,273
METHOD OF PRODUCING CAN BODIES
HAVING VENTED SIDE SEAMS
Filed March 27, 1947  4 Sheets-Sheet 2

INVENTOR
Thomas Begg
BY Ivan D. Thornburgh
Charles H. Erne
ATTORNEYS

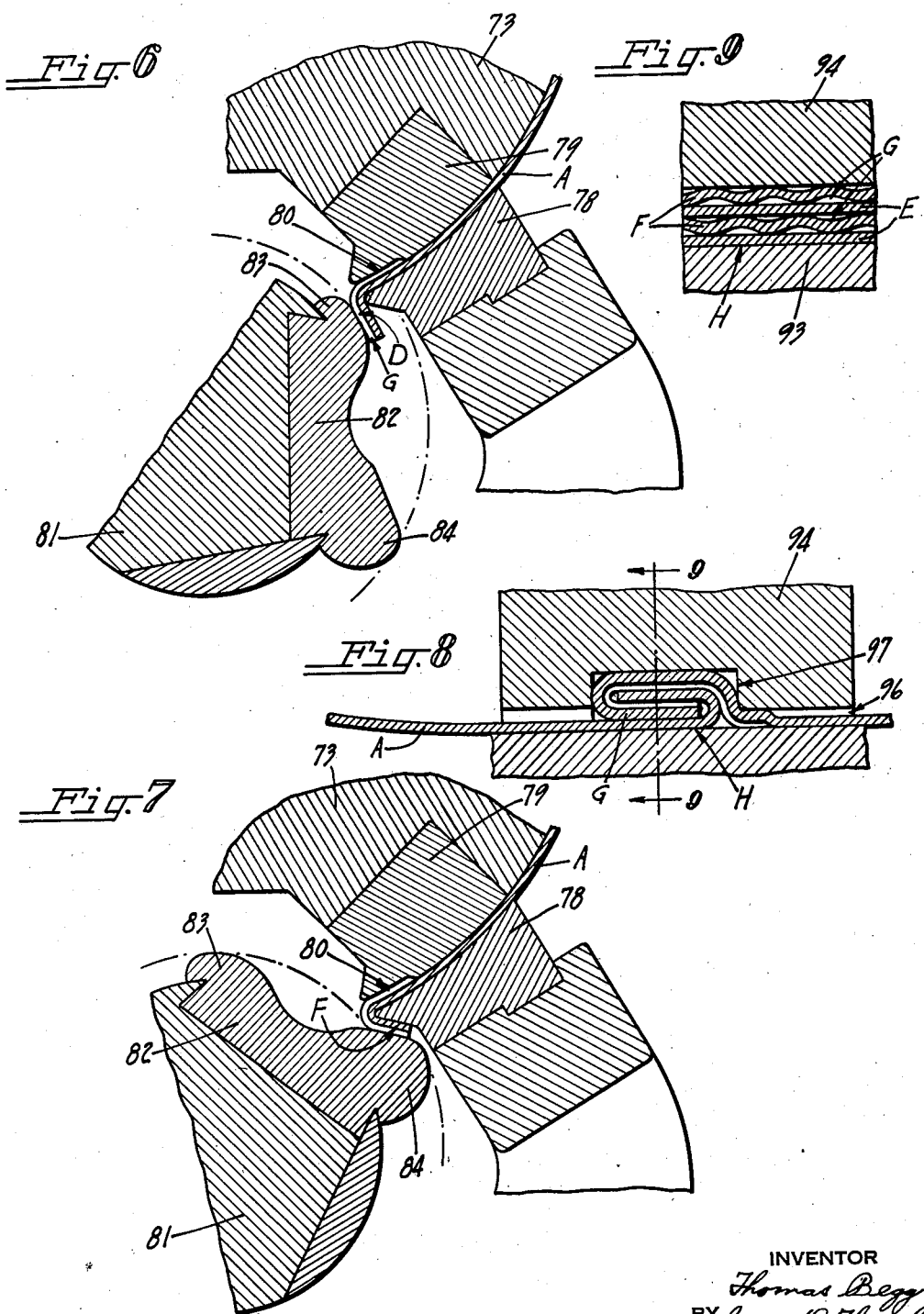

Feb. 1, 1949.                     T. BEGG                       2,460,273
                       METHOD OF PRODUCING CAN BODIES
                           HAVING VENTED SIDE SEAMS
Filed March 27, 1947                                    4 Sheets-Sheet 4
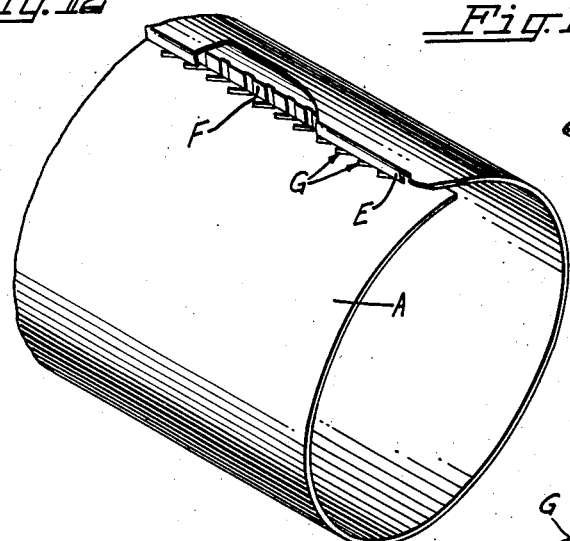
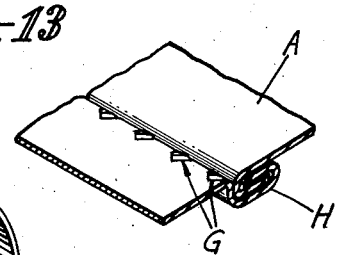
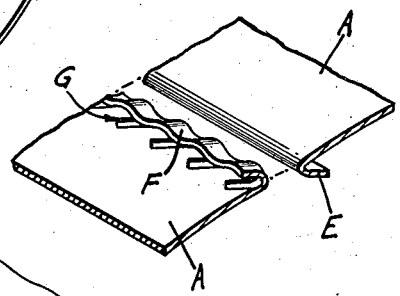
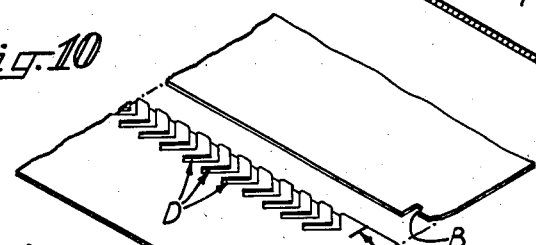
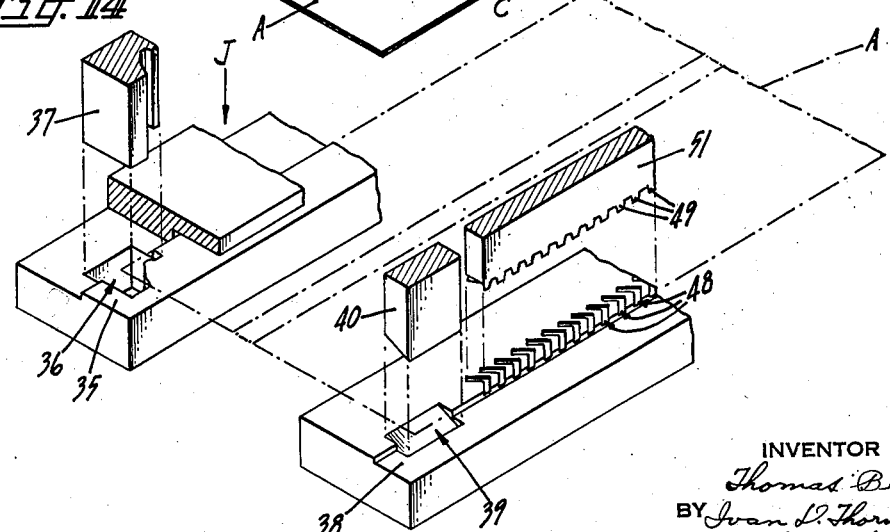
INVENTOR
Thomas Begg
BY
ATTORNEYS Patented Feb. 1, 1949

2,460,273

UNITED STATES PATENT OFFICE 2,460,273

METHOD OF PRODUCING CAN BODIES HAVING VENTED SIDE SEAMS

Thomas Begg, Nutley, N. J., assignor to American Can Company, New York, N. Y., a corporation of New Jersey Application March 27, 1947, Serial No. 737,556

2 Claims. (Cl. 113—120)

The present invention relates to a method of producing can bodies having vent channels formed in the side seams for venting the seams during a subsequent soldering operation and has particular reference to forming vent channels which extend around the line of bend in the side seam hooks so that the interior of the seam will be fully vented. This is a continuation-in-part of my copending United States application Serial Number 513,507 filed December 9, 1943 and patented November 4, 1947 as Patent No. 2,429,982 on Can body making machine.

An object of the invention is the provision of a method of producing a vented side seam in a sheet metal can body wherein at least one of the seam hooks is formed with corrugations which set off continuous and uninterrupted vent channels extending around the line of bend of the hook from the outside of the body into the interior of the seam for insuring easy inflow and equal distribution of fluid solder to all parts of the seam during a subsequent soldering operation.

Another object is the provision of such a method of producing a vented side seam wherein the vent channels may be readily formed in a flat body blank before bending the blank into a tubular can body shape so that the vent channels may be accurately located in the body and so as to facilitate and expedite locating and forming of the channels.

Another object is the provision of such a method of producing a vented side seam wherein the vent channels formed in the blank are protected against being ironed out or flattened during the formation of the seam hooks and during the interfolding of the hooks into a closed side seam ready for soldering to insure continuous full form channels extending into all parts of the seam upon completion of the seam forming operations.

Numerous other objects and advantages of the invention will be apparent as it is better understood from the following description, which, taken in connection with the accompanying drawings, discloses a preferred embodiment thereof.

Referring to the drawings:

Figs. 6 and 7 are enlarged fragmentary sectional views of portions of the edging device illustrated in Fig. 3 and showing the steps of forming the side seam hooks on a can body;

Fig. 8 is an enlarged sectional view of the bumping element illustrated in Fig. 5 and a portion of a can body showing its closed side seam in a confined position in the bumping element;

Fig. 9 is a sectional view taken substantially along the line 9—9 in Fig. 8;

Fig. 10 is an enlarged perspective view of oppositely disposed side seam edge portions of a body blank illustrating notches and embossed corrugations in the side seam edge portion;

Fig. 11 is a greatly enlarged fragmentary detail of the side seam edge portions shown in Fig. 10 after they have been formed into hooks preparatory to interlocking them to form the side seam;

Fig. 12 is an enlarged perspective view of an incomplete can body produced in accordance with the instant method invention and illustrating a formed blank with its opposite edges interengaged in readiness to be bumped into a side seam;

Fig. 13 is a view similar to Fig. 11 showing the hooked edges interlocked preparatory to being soldered to form the completed side seam, and Fig. 14 is a schematic perspective view of a notching station showing can body blank notching, slitting and embossing die mechanism, with parts broken away, and showing in dot and dash lines a can body blank in place.

Figure 1:
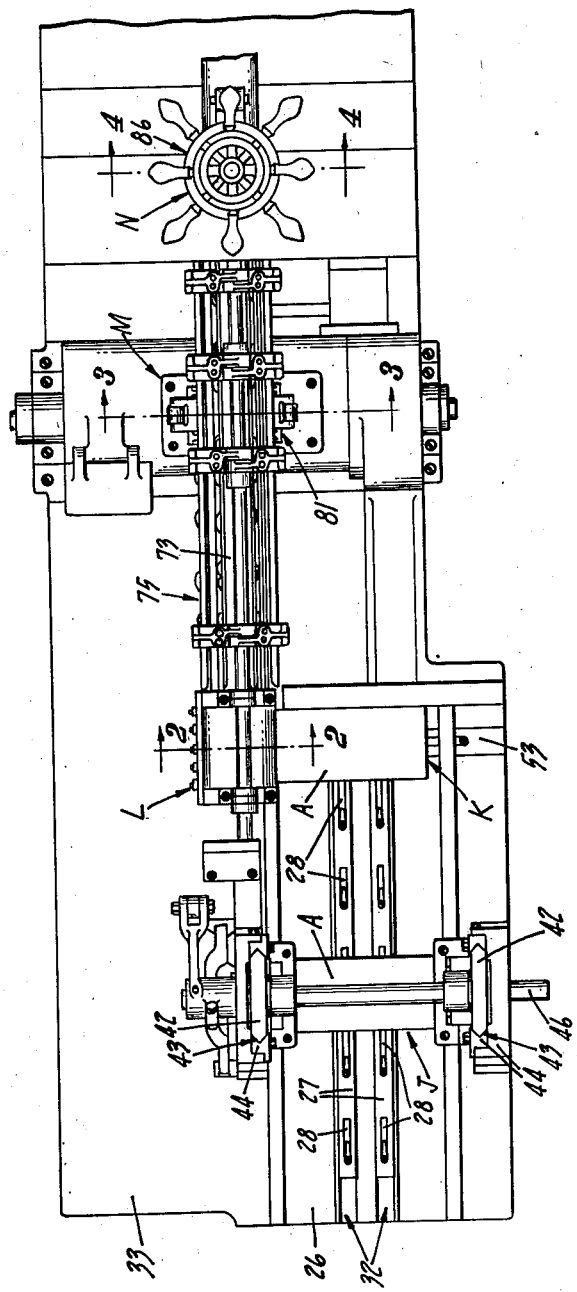
Figure 1 is a top plan view of a machine for carrying out the method steps of the instant invention, with parts broken away.

As a preferred embodiment of the present invention the drawings illustrate a method of producing sheet metal tubular can bodies having vent channels formed in the side seams for venting the seams during a subsequent soldering operation. The bodies preferably are made from flat substantially rectangular shaped sheet metal blanks A (Fig. 1). The side seam edges of the blanks are first cut to form lock and lap seam notches B (Fig. 10) and slits C. The seam edge containing the slits C and hereinafter called the slit edge is then formed with a plurality of spaced chevron shaped corrugations or serrations D as shown in Fig. 10 although it will be understood that the opposite edge or both edges can be formed with these corrugations if desired. The corrugations preferably are arranged in a herringbone pattern along the side seam edge and extend from the outer terminal edge of the blank inwardly and transversely of the side seam portion.

Following the step of impressing the corrugations D into the blanks, the blanks A are formed or bent into tubular shape. While in this shape the side seam edges are bent in opposite directions to form seam hooks E, F as shown in Fig. 11. The hook F includes the corrugations D. In forming this hook F the seam edge of the blank is bent across the corrugations at the apexes of the chevrons, thereby distributing and aligning the legs of the corrugations in each side of the hook and thus producing in the hook continuous or uninterrupted vent channels G which extend around the line of bend of the hook.

After thus forming the hooks E, F in the curved or tubular shaped blank, the hooks are interengaged as shown in Fig. 12 and are then closed by bumping them together. This bumping operation interfolds the hooked edges and results in a side seam H as shown in Figs. 8, 9 and 13 and thus completes the can body forming operations preparatory to sealing the seam by a subsequent bonding of the seam parts with fluid or molten solder.

In such a method of forming a lock side seam the venting channels G are continuous and uninterrupted and extend from the exterior of the body into all parts of the seam, including the line of bend of the hook F so that all parts of the seam are fully vented during the subsequent seam soldering operation.

One form of machine for carrying out the above described steps of the instant method invention is illustrated in the drawings and is similar to and of the type of the can body forming machine disclosed in United States Patent Number 1,770,041, issued July 8, 1930 to John F. Peters. In such a machine, the various steps of the instant method of forming can bodies are effected at stations through which the can body blanks A are fed or advanced in an intermittent or step-by-step manner.

The flat blanks A are first fed into a notching station J (Figs. 1 and 14) where the opposite side seam edge portions of the blanks are notched in the usual manner with the notches B and slits C. The corrugations D providing the vent channels G are preferably formed at this station simultaneously with the cutting of the notches B and slits C.

The notched and corrugated or embossed body blanks then are moved onto a transverse feeding device K for delivery into a second or body forming station L (Figs. 1 and 2) where they are formed into the tubular shape around a body forming horn in the usual manner. The tubular shaped can bodies then are advanced along the horn to a third or body edging station M (Figs. 1 and 3) where the opposite or seam edge portions are formed into the hooks E, F. The can bodies thereafter are moved along the horn into a fourth or body bumping station N (Figs. 1 and 4) at which station the hooked side seam edges are interlocked and bumped together into the body side seam H (Figs. 8, 9 and 13).

Advancement of the individual blanks A into the notching station J is effected along a table 26 (Fig. 1) by reciprocating feed bars 27 having spaced depressible feed dogs 28. The feed bars are slidable in grooves 32 formed in the table. The table is located at the feed-in end of the machine and is mounted on a machine main frame 33. The feed bars are reciprocated in time with the other moving parts of the machine in any suitable manner, as for example, by a crank unit as disclosed and described in the above mentioned Peters patent.

The notches B and slits C located in the opposite side seam edge portions of the blank are formed while the blank momentarily rests at the notching station. This is effected by two sets of cooperating lower and upper die elements disposed in transversely spaced relation so that the blank is located between the two sets of elements. One set of die elements comprises a stationary lower notching die 35 (Fig. 14) having a notching recess 36 and a vertically reciprocable upper notching punch member 37 between which the notch edge of the blank is interposed. These die elements cut the notches B in the blank when the punch moves down into the die recess.

The other set of die elements for producing the slits C comprises a stationary lower slitting die 38 having a slitting recess 39 and a vertically reciprocable upper slitting punch 40 between which the slit edge of the blank is interposed. These die members are of usual construction and cut the slits C in opposite ends of the blank when the punch moves down into the die recess.

The stationary notching die 35 and the stationary slitting die 38 are located in the usual bed plates bolted to the table 26. The vertically reciprocable punches 37, 40 are secured in a pair of transversely spaced vertical slides 42 (Fig. 1) which operate in slideways 43 formed in a pair of brackets 44 secured to the table 26. The slides are reciprocated in unison in any suitable manner, such as for example, by a link and lever connection with a rocker shaft 46 as disclosed in the above mentioned Peters patent.

The embossing or impressing of the vent channel serrations D in the slit edge of the blank, which preferably is effected simultaneously with the notching and slitting operation as hereinbefore mentioned, is brought about by a lower stationary female die part having serration recesses 48 (Fig. 14) and an upper movable male embossing die part having serration embossments 49. The drawings show the recesses 48 formed in the slitting die 38 although these recesses may be formed in a separate die member if desired. The embossments 49 are formed preferably in an embossing die block 51 which is secured to the slide 42 with the slitting punches 40.

Hence when the slides 42 move through a down stroke to notch and slit the blank, the embossing die block 51 moves down with the slides and in cooperation with the serration recesses 48 impress the vent channel corrugations D into the slit edge of the blank. Thus the forming of the serrations is brought about simultaneously with the forming of the notches and the slits and at the same station. No other extra operations or handling therefore is needed and thus time and energy are saved.

Figure 2:
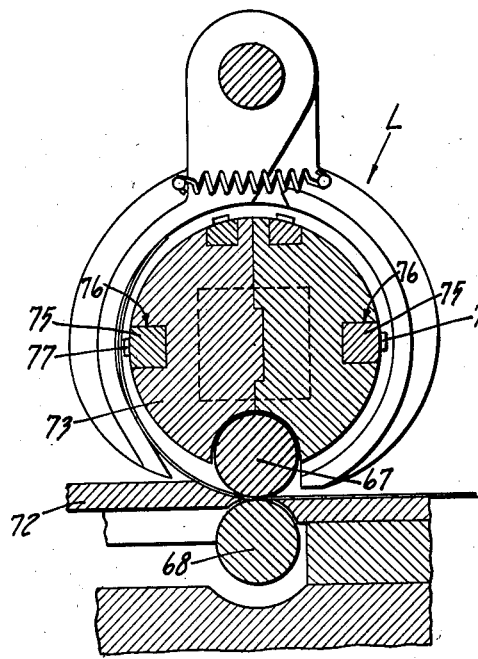
Fig. 2 is an enlarged sectional view taken substantially along the line 2—2 in Fig. 1, showing the principal parts of a device for effecting the can body forming step of the method, with parts broken away.

The can body blank A with its side seam edges now in a prepared condition as illustrated in Fig. 10, is removed from the notching station and is advanced along the feed table 26 by the feed bars 27 into the transverse feeding device K. In the feeding device K a reciprocating feed bar 53 (Fig. 1) advances the body blank endwise into body forming devices located at the second or body forming station L (Figs. 1 and 2). These devices are of the type disclosed in the above mentioned Peters patent and include a pair of continuously rotated feed rollers 67, 68 for feeding the blank against a stationary body forming tool 72 in the regular manner. These rollers are separable in time with the operation of the transverse feeding devices K to permit the corrugated edge of the blank to pass the rollers without obliterating the corrugations. Such a separable roller forming device is disclosed in United States Patent 2,315,535 issued April 6, 1943 to L. R. McCann on Blank feeder for can bodymakers. The tool bends the body blank into tubular shape and wraps it around a body forming horn 73.

The body forming horn 73 is supported above the main frame 33 in the manner disclosed in the Peters patent and extends longitudinally of the machine (see Fig. 1). It is along this horn that the partially prepared can bodies are advanced for the subsequent operations at the different working stations. The bodies are advanced along the horn by reciprocating feed bars 75 (Fig. 2) which slide in grooves 76 formed in the horn. Each of these feed bars carries a plurality of spaced depressible feed dogs 77 for engaging behind and advancing the bodies.

Figure 3:
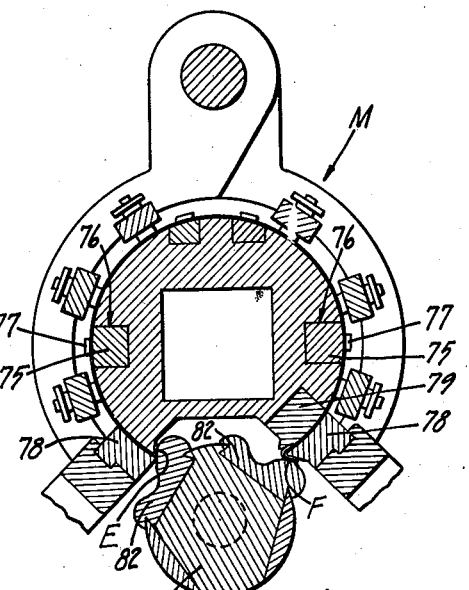
Fig. 3 is a view similar to Fig. 2 taken substantially along the line 3—3 in Fig. 1 showing the principal parts of a device for effecting the can body edging step, parts being broken away.

Following the forming of the blank into tubular shape at the forming station it is advanced along the horn 73 into the third or body edging station M (Figs. 1 and 3). At this station the curved body blank adjacent its seam edge portions is clamped against the horn by a pair of movable clamps 78 to hold the blank in position for the edging operation. The bottom of the horn is relieved adjacent these clamps to permit the edge portions of the blank to extend out into space a distance equal to the length of the hook to be formed at this station. In order to prevent ironing out or flattening of the corrugations D in the slit edge of the body, the horn 73 adjacent the path of travel of this edge of the body is provided with an insert 79 (see also Figs. 6 and 7). The insert is provided with a clearance recess 80 for the corrugations D to shield and protect the corrugations against obliteration when the clamp 78 presses the blank against the horn.

While the body blank is thus held clamped against the horn 73 the projecting seam edge portions are reversely bent to produce the inner and outer hooks E, F shown in Fig. 11, the hook F including the corrugations D. This bending of the hooks is effected by an oscillating edging device 81 having a pair of edging steels 82 formed with a short edging projection 83 and a long edging projection 84. The edging device is rocked, first in one direction and then in the opposite direction to effect the edging operation, in any suitable manner such as that disclosed in the Peters patent hereinbefore mentioned.

The edging device 81 first rocks in a clockwise direction as viewed in Fig. 6. During this movement of the device its short edging projections 83 engage against the projecting edge portions of the body blank and wipe them into a position at substantially right angles to the blank. As viewed in Fig. 3 it will be noticed that the notched edge of the blank is wiped inwardly while the slit and serrated edge is wiped outwardly. The notched edge is bent around the recessed edge of the horn while the slit edge is bent around the edge of the clamp 78 as shown in Fig. 6.

In order to prevent ironing out or obliteration of the corrugations D in the slit edge during this edging operation a clearance space equal to the thickness of the blank plus the depth of the corrugations is provided between the edge of the clamp 78 and the short projection 83. Thus the short projection merely bends the edge of the blank without in any way altering the corrugations and thus the corrugations continue in full form around the line of bend.

After thus bending the edges of the blank at right angles as shown in Fig. 6 the edging device 81 rocks backwardly in a counterclockwise direction as viewed in Figs. 3 and 7. This backward movement of the device brings the long projections 84 into engagement with the right angle edges of the blank and further bends them in the same direction into an acute angle position. The notched edge is bent back against the inside of the horn as shown in Fig. 3 while the slit edge is bent back against the clamp 78 as shown in Fig. 7.

It should be noted that the movement of the long projections 84 is just sufficient to bend the blank edge back into contact with the clamp 78 without flattening or obliterating the corrugations D so that these corrugations are preserved in full form as shown in Fig. 7. It is this edging operation that forms the hooks E, F. In the hook F the line of bend extends along the apexes of the chevron shaped corrugations D. Thus the two legs of the corrugations are brought into alignment and extend in the same direction providing a continuous vent channel extending around the line of bend of the hook.

Figure 4:
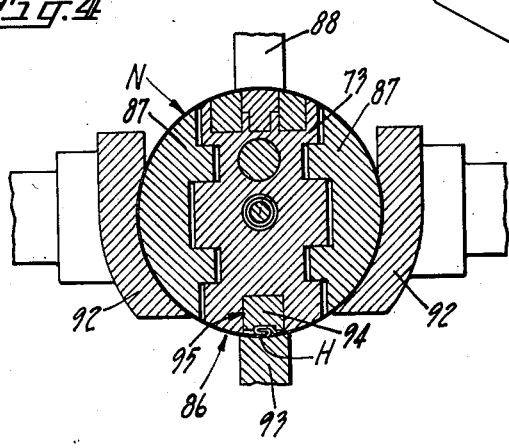
Fig. 4 is a view similar to Figs. 2 and 3 taken substantially along the line 4—4 in Fig. 1 showing the important parts of a bumping mechanism for effecting the can body side seam closing step, parts being broken away.

The inner and outer hooks of the partially prepared tubular body now are ready for interengaging as best illustrated in Fig. 12, preparatory to the bumping together of the hooks. For this purpose the body is moved along the horn 73 into a side seam bumping mechanism 86, located at the fourth or can body side seam bumping station N (Fig. 4). The body forming horn at this station is substantially rectangular in outline and has expandable segments 87 on opposite sides which are of the usual form and which are movable for receiving, sizing and releasing the partially formed can body.

With a body in position at this station (Fig. 4), a hold down bar 88 holds the body in place while a pair of wing forming elements 92 move inwardly against it and interengage the hooks in the conventional manner. The interengaged hooks E, F are locked together by a vertically reciprocating bumping element or hammer 93 (Fig. 4) which produces the body side seam H having included therein the corrugations D. These bumping mechanism elements are actuated preferably in the manner disclosed in the Peters patent.

Figure 5:
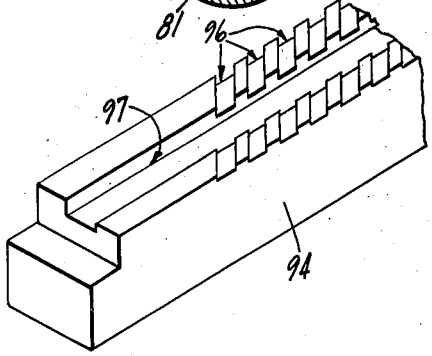
Fig. 5 is an inverted perspective view showing a detail of a bumping element of the bumping mechanism, with a portion broken away.

In order to preserve the corrugations D against obliteration during the bumping operation the hooks E, F are backed up by and confined in an anvil or bumping spline 94 (Figs. 5 and 8) disposed in a slot 95 (Fig. 4) in the lower side of the horn. The spline is formed with spaced diagonal clearance grooves 96 and a longitudinal clearance groove 97. The diagonal grooves 96 are arranged to receive the corrugations D on the sides of the seam H while the longitudinal groove receives the seam itself. The depth of the longitudinal groove is just sufficient to confine and permit the proper closing of the seam by the bumping hammer 93 without any ironing out or flattening of the corrugations embodied in the seam. For this purpose the hammer merely compresses the body blank against the edges of the spline while the seam hooks are pressed into and are confined by the clearance groove to prevent undue pressure being exerted on the corrugations.

This cooperative effect between embossing, edging and bumping results in the formation of the vent channels G which extend from the exterior of the body around the line of bend of the hook F (Figs. 8 and 9) into and through the side seam and terminate adjacent the interior of the body. Such vent channels permit easy inflow and equal distribution of fluid or molten solder to all parts of the vented lock and lap side seam during the soldering operation that follows in an adjacent or subsequent machine.

The partially completed can body following the bumping of the side seam H is removed from the bumping station for discharge from the instant machine. Preparation for this movement is made by collapsing the horn from its position in Fig. 4 in the usual manner as by moving the expandable segments 87 inwardly. The hold-down bar 82 moves up and the wing forming elements 92 move outwardly releasing their hold on the body which then is free to be shifted along the horn for discharge from the machine. This completes the cycle of operation of the machine for carrying out the steps of the instant method invention.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodimnt thereof.

I claim:

1. The method of producing sheet metal can bodies having vent channels formed in the side seams thereof to facilitate soldering, comprising impressing corrugations in a blank extending inwardly from a marginal side seam edge portion thereof, forming said blank into a substantially tubular can body, bending said corrugated side seam portion of the blank along a fold line extending longitudinally of the blank and transversely across said corrugations to produce a side seam hook having spaced vent channels of substantial U-shape extending around the bend of the hook, bending the opposite marginal side seam edge portion of the blank into a cooperating uncorrugated hook, loosely interengaging said hooks, and finally bumping said interengaged hooks together without flattening said corrugations, to produce an interlocked transversely corrugated side seam including said spaced vent channels therein for a subsequent soldering operation.

2. The method of producing sheet metal can bodies having vent channels formed in the side seams thereof to facilitate soldering, comprising impressing corrugations in a flat blank extending inwardly from a marginal side seam edge portion of the blank, forming said blank into a substantially tubular can body, bending said corrugated side seam portion of the blank along a fold line extending longitudinally of the blank and transversely across said corrugations to produce a side seam hook having spaced vent channels of substantial U-shape extending around the bend of the hook, bending the opposite marginal side seam edge portion of the blank into a cooperating uncorrugated hook, loosely interengaging said hooks, and finally bumping said interengaged hooks together while providing a clearance for said hooks to prevent flattening said corrugations, to produce an interlocked transversely corrugated side seam including said spaced vent channels therein for a subsequent soldering operation.

THOMAS BEGG.

REFERENCES CITED

The following references are of record in the file of this patent:

UNITED STATES PATENTS

| Number | Name | Date |
|---|---|---|
| 663,385 | Hobbs | Dec. 4, 1900 |
| 2,167,737 | Anderson | Aug. 1, 1939 |